W. R. WALLACE.
ROCK CORE DRILL.
APPLICATION FILED MAR. 31, 1911.
1,019,206.
Patented Mar. 5, 1912.
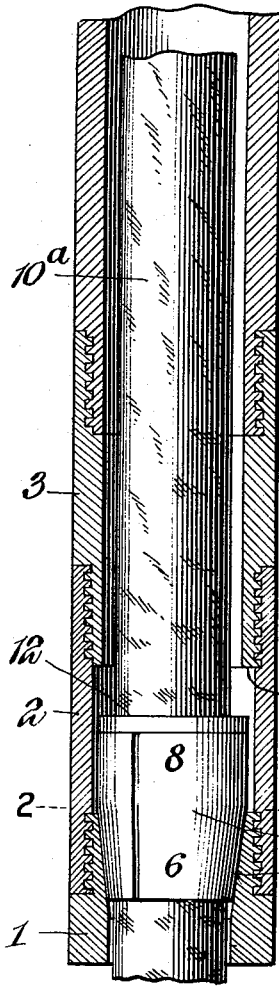
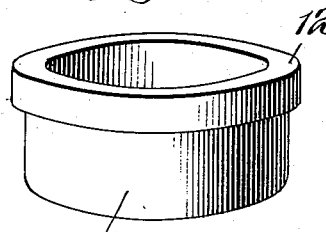
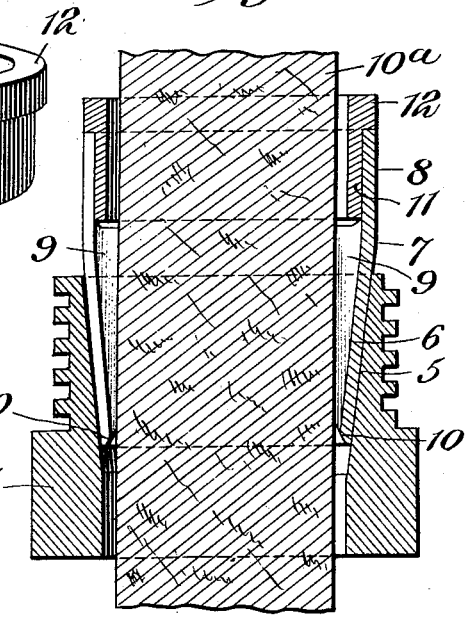
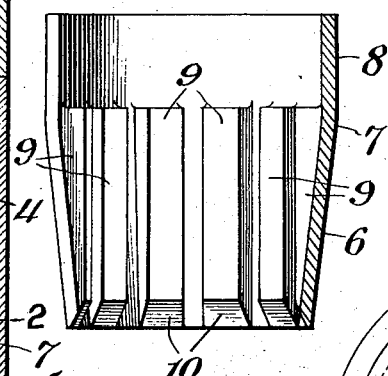
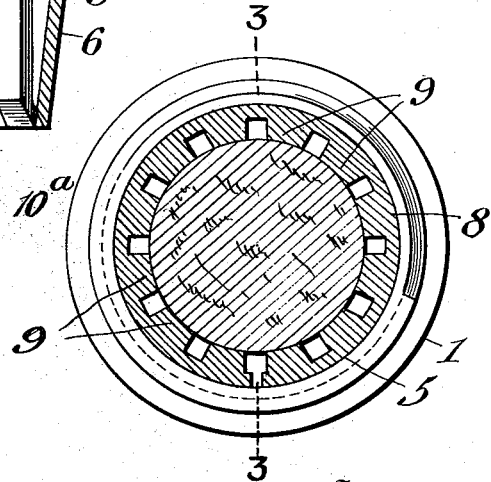
Witnesses
Howard D. Orr.
F. J. Chapman.
W. R. Wallace, Inventor,
By E. G. Siggers
Attorney

UNITED STATES PATENT OFFICE.

WILLIAM R. WALLACE, OF HOUGHTON, MICHIGAN.

ROCK-CORE DRILL.

1,019,206.   Specification of Letters Patent.   Patented Mar. 5, 1912.

Application filed March 31, 1911   Serial No. 618,227.

*To all whom it may concern:*

Be it known that I, WILLIAM R. WALLACE, a citizen of the United States, residing at Houghton, in the county of Houghton and State of Michigan, have invented a new and useful Rock-Core Drill, of which the following is a specification.

This invention has reference to improvement in rock core drills which are usually, though not necessarily, diamond drills, whereby an annular cut is made leaving a core along which the drill body progresses, and which must ultimately be removed from the bore.

It is the object of the present invention to provide a means whereby such core may be broken off and removed from the bore from time to time as may be found necessary.

For many years it has been customary to employ a hollow conical spring gripper adapted to engage in a conical seat usually formed in the drill head, and such spring is provided with inward projections which will engage and grip the core with sufficient force when the spring is moved firmly into the conical seat to cause a breaking off of the core close to the end of the bore and by lifting the core barrel with the drill head at the end thereof from the bore, the broken off core will be lifted with it and so may be removed from the bore. The spring gripping member is so made that it will have an elastic tendency toward the core, but does not normally grip the core with sufficient firmness to prevent the relative progression of the core through the spring gripping device during the boring action, but the spring does grip the core sufficiently to be drawn thereby into firm engagement with the taper seat when the drill is lifted. Such taper rings of spring steel with interior ribs have been in use for many years and it has been found in practice that there is a liability of the core catching the smaller end of the ring, which is the core entering end of the ring, and as the ring is thereby pushed into the larger portion of the casing beyond the taper seat in the drill head, such ring is turned to a certain extent and becomes jammed when so caught and turned, and this often results in the breaking of the ring. Furthermore, the spring ring must have at all times a normal tendency toward the core to cause it to grasp the core with sufficient force to be moved by the latter, although this force is not sufficient to prevent the movement of the ring along the core as the drilling progresses. It is found in practice that the rings are liable at times to lose their elasticity or to be so sprung as to no longer normally engage the core, and consequently the latter is not gripped by the ring and is not broken off and removed from the bore. The present invention avoids these difficulties by providing the large end of the taper ring with an axial extension which not only avoids the liability of springing the ring to an extent preventing it from normally grasping the core, but this extension also prevents any turning of the ring since it fits quite snugly in the core shell beyond the larger end of the taper portion of the ring, thereby constituting a guide, the projections designed to engage the core extending only so far as the taper portion and not into the axial portion of the ring. Because of the omission of the core gripping projections in the axial extension of the ring there is provided a bushing loosely fitting the extended portion of the ring and serving as a guide for the core. The ring has a play longitudinally of the boring head and core shell adjacent thereto sufficient to permit the seating and unseating of the ring with respect to the taper portion of the interior of the body or boring head, but its extent of play is insufficient to permit the bushing to move out of the extended portion of the clamping ring, so that under no circumstances can the bushing become jammed by engagement of the core therewith.

The invention will be best understood from a consideration of the following detailed description taken in connection with the accompanying drawings, in which latter the invention is shown in a practical form, but it will be understood that the particular construction shown is not mandatory for the invention is susceptible of various changes and modifications so long as there is no material departure from the scope of the invention.

In the drawings:—Figure 1 is a longitudinal section of a drilling bit or head and the portion of the core ring carrying the same, the core lifting ring and the core being shown in elevation with the core lifting ring or clamp seated in the bit in position to lift the core. Fig. 2 is a section on the line 2—2 of Fig. 1 omitting the core barrel and showing the parts on a larger scale than Fig. 1. Fig. 3 is a section on the line 3—3 of Fig. 2. Fig. 4 is a perspective view of the bushing for the ring extension. Fig. 5 is a section, on the same line as Fig. 3, of the core lifting spring ring.

Referring to the drawings, there is shown a drill head or bit 1, which in practice is provided at its active end with cutters, usually diamonds, but the cutters not entering into the present invention have been omitted from the drawing. The bit is screwed into the end of a shell 2, which in turn receives at the end remote from the bit a core barrel 3, which barrel may be many feet long and may be made in as many sections as is desirable. The interior diameter of the core shell 2 is greater than that of either the drill head 1 or core barrel 3, so that the end of the core barrel where entering the shell 2 forms a shoulder 4. The end of the bit 1 remote from the active end has the interior portion formed into a taper seat 5 flaring away from the active end of the bit and to this taper seat there is adapted the taper portion 6 of a split ring 7, the ring 7 being split in the direction of its length, so that it may contract and expand within limits. This ring 7 has a substantially cylindrical extension 8 from its larger end, which extension fits freely within the core shell 2 but is too large to pass into the barrel 3 by the shoulder 4. Within the taper portion 6 of the ring 7 is a circular series of inwardly directed projections 9 to embrace a core 10 formed by the action of the bit or drill head, which latter cuts an annular groove leaving the core intact. The inner faces of the projections 9 define a substantially cylindrical space for the passage of the core, these projections being thicker at the wide end of the ring than at the narrow end thereof, and at the latter end are beveled, as indicated at 10, so that the core on first entering the ring will be guided by these beveled portions. The ring is so proportioned in diameter with relation to the cut produced by the bit or boring head that the space defined by the inner edges of the projections 9 is of somewhat less diameter than the core produced, so that the ring must slightly expand for the passage of the core, and, therefore, the ring will normally grip the core with some force but not enough to prevent the movement of the ring along the core due to the progressive movement of the bit into the bore. As the boring progresses the ring is carried by the core and ultimately the shoulder 4 engages the wider or upper end of the ring, considering the bore as vertical, when further progressive movement of the bit and core barrel forces the ring to travel therewith, thus moving along the core but still grasping the core with sufficient firmness to hold the ring to the core when no superior force is acting on the ring. The outer walls of the ring are comparatively thin, the showing of the drawings in Figs. 2, 3, 4 and 5 being on an exaggerated scale.

Should the core on first engaging the ring strike the smaller end thereof so much to one side as to engage the corresponding edge of the ring, the latter will be forced toward the shoulder 4, but the extension 8 of the ring being always within the space defined by the inner wall of the shell 2 between the bit 1 and shoulder 4 and extending for a considerable distance along said shell, all liability of tilting the spring ring sufficiently to cause it to jam is effectually prevented and the core because of the very slight engagement with the end of the ring is forced toward the interior of the ring and ultimately is lodged within the space defined by the inner edges of the projections 9, whereby the core is thereafter properly guided.

In core lifting rings as heretofore constructed, the projections 9 and the taper portion 6 are substantially coincident, the ring not extending beyond the taper portion, and it is because of this shortness of the ring that the core on first engaging the ring does at times force such short ring into the shell 2 in position to jam therein, thus usually breaking the ring and oftentimes breaking the core. Again, it has been found, in practice, that such a short ring will at times open out and stay open far enough to allow a core to slip through and remain in the drill hole when the drill is lifted. Both of these conditions cause trouble in drilling and give rise to expensive and time consuming conditions.

In the structure of the present invention the taper portion is substantially like the taper rings commonly used, but the extension beyond the large end of the taper portion joins the latter at a slight angle, thus making the ring more elastic and somewhat stiffer even though the shell of the ring be of thin steel, thus preventing the ring from acquiring a permanent set from constant use, whereby it will stay open sufficiently to move loosely on the core.

Since the extension 8 is of considerably greater internal diameter than the inner diameter defined by the inner edges of the extensions or ribs 9, there is a liability of the core jamming above the ribs 9, and to overcome this trouble there is provided a bushing or filter ring 11 having a terminal flange 12, the body of the ring fitting quite snugly in the extension 8, but not so snugly as to prevent the contraction of the ring, while the flange 12 is engaged by the free edge of the extension 8 and in turn is brought into engagement with the shoulder 4 instead of the extension 8 engaging such shoulder 4 directly. The internal diameter of the filler ring or bushing 11 may approach the inner diameter of the ring as defined by the ribs 9, but is made somewhat greater, so that the end of the core will not engage the edge of the filler ring 11 adjacent such ribs.

As the boring progresses, the core 10ᵃ is formed, and ultimately the core comes into coincidence with the smaller end of the ring 7 and enters said ring in engagement with the ribs 9 slightly expanding the ring, which thereupon is held against movement, while the boring progresses until ultimately the shoulder 4 comes into engagement with the flange 12 and the ring 7 is then carried along with the barrel 3, although in engagement with the core, and this condition prevails so long as the boring continues. If, now, it be desirable to remove the drill and with it so much of the core as has been formed, the drill barrel is lifted and the shoulder 4 is carried away from the flange 12 because the ring 7 engages the core with a sufficient grip to hold it to the core without movement thereon. Ultimately the taper shoulder 5 engages the taper end 6 of the ring and the latter is contracted about the core until it very tightly grips the core, further movement of the barrel 3 only serving to increase the force of the grip. The result is that the core is broken off on the bit side of the ring and is then carried by the barrel 3 and parts attached thereto to the surface when it may be removed in the usual manner.

With the present invention there can be no turning or sluing of the lifting ring to an extent sufficient to cause jamming, because of the extension 8, nor will constant use produce a set to the ring causing it to become loose on the core while the bushing 11 obviates any danger of the core jamming in the portion of the ring of wider diameter beyond the ribs 9.

What is claimed is:—

1. In a rock core drill, a one piece elastic core lifting ring of substantially even thickness throughout and having a full length longitudinal slot, said ring having at one end a tapered portion provided with integral interior core engaging members and at the other end an axial extension of substantially even diameter, said extension being at the larger end of the taper portion of the ring and joining the taper portion at an angle, thereby stiffening the whole ring.

2. In a rock core drill, a one piece core lifting ring comprising an elongated tubular member of even thickness throughout and split at one side from end to end, said tubular member being elastically constrained to a predetermined diameter with one end tapering and the other end of even diameter throughout, the tapering end being provided on the interior with integral spaced inward extensions or ribs adapted to engage a core and the end of even diameter throughout joining the tapering end at an angle thereby stiffening the whole ring.

3. In a rock core drill, a one piece elastic split lifting ring of substantially even thickness throughout and having one end tapering and there provided with means for engaging the core and the other end substantially cylindrical and joining the tapering portion at a slight angle, thereby stiffening the entire ring.

4. In a rock core drill, an elastic split lifting ring having one end tapering and the other end substantially cylindrical, and a cylindrical bushing or filling ring adapted to the cylindrical end of the ring.

5. In a rock core drill, an elastic split lifting ring having one end tapering and the other end substantially cylindrical, and a cylindrical bushing or filling ring adapted to the cylindrical end of the ring, said filling ring or bushing being provided at one end with a radial flange adapted to override the corresponding end of the ring.

6. In a rock core drill, a one piece shell of spring steel of substantially even thickness throughout and split from end to end at one side, the shell having one end tapering and the other substantially cylindrical, the tapering portion being provided on its interior with inward projections or ribs with the inner edges defining substantially a cylinder and the cylindrical portion of the shell joining the tapering portion at a slight angle and thereby stiffening the whole shell against receiving a permanent expanded set.

7. In a rock core drill, a split shell of spring steel having one end substantially cylindrical and the other end tapering, the tapering end being provided on its interior with inward projections or ribs with the inner edges defining substantially a cylinder, and a bushing adapted to the cylindrical portion of the shell and having an inner diameter greater than the diameter defined by the inner edges of the ribs.

In testimony, that I claim the foregoing as my own, I have hereto affixed my signature in the presence of two witnesses.

WILLIAM R. WALLACE.

Witnesses:
    JAS. T. HÉALY,
    AUGUSTA JUNKER.